(12) United States Patent
Shipley et al.

(10) Patent No.: US 8,953,521 B1
(45) Date of Patent: Feb. 10, 2015

(54) FACILITATING COMMUNICATION BETWEEN WIRELESS ACCESS COMPONENTS

(75) Inventors: Trevor D. Shipley, Olathe, KS (US); John D. Sumler, Bonner Springs, KS (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 540 days.

(21) Appl. No.: 12/968,601

(22) Filed: Dec. 15, 2010

(51) Int. Cl.
*H04W 4/00* (2009.01)

(52) U.S. Cl.
USPC ............................................ 370/328; 370/252

(58) Field of Classification Search
USPC .................. 370/252, 328, 329, 331, 338, 401
See application file for complete search history.

(56) References Cited

U.S. PATENT DOCUMENTS

| | | | | |
|---|---|---|---|---|
| 7,142,882 B2 * | 11/2006 | Schmidt | ..................... | 455/552.1 |
| 7,162,250 B2 * | 1/2007 | Misra | ............................ | 455/453 |
| 7,272,123 B2 * | 9/2007 | Wall | .............................. | 370/331 |
| 7,313,628 B2 * | 12/2007 | Chaskar et al. | ............... | 709/238 |
| 7,912,473 B2 * | 3/2011 | Fodor | .............................. | 455/453 |
| 8,000,716 B2 * | 8/2011 | Tsao et al. | ..................... | 455/453 |
| 2006/0153085 A1 * | 7/2006 | Willins et al. | ................. | 370/242 |
| 2007/0094409 A1 * | 4/2007 | Crockett et al. | ............. | 709/233 |
| 2007/0253385 A1 * | 11/2007 | Li et al. | ......................... | 370/338 |
| 2010/0214943 A1 * | 8/2010 | Immendorf et al. | .......... | 370/252 |
| 2011/0053598 A1 * | 3/2011 | Ahluwalia | ..................... | 455/436 |
| 2011/0082939 A1 * | 4/2011 | Montemurro et al. | ........ | 709/227 |
| 2011/0128862 A1 * | 6/2011 | Kallin et al. | .................. | 370/245 |
| 2011/0216743 A1 * | 9/2011 | Bachmann et al. | ........... | 370/331 |

* cited by examiner

*Primary Examiner* — Ricky Ngo
*Assistant Examiner* — Christine Ng (57) ABSTRACT

The invention is directed to methods for facilitating communication between multiple wireless access components. Initially, a second wireless access component is detected to be within range of a first wireless access component. It is determined that a wireless connection is to be established between the wireless access components. Access information is exchanged between the wireless access components indicating capacity and current usage of each other's outbound link to the Internet. A wireless connection is then established between the two wireless access components, thus allowing for routing of Internet traffic between the wireless access components.

14 Claims, 6 Drawing Sheets

FACILITATING COMMUNICATION BETWEEN WIRELESS ACCESS COMPONENTS

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, the establishment of a local wireless connection between multiple wireless access components, such as wireless routers or hotspots. While wireless access components typically do not communicate with one another, utilizing embodiments of the present invention, they are able to communicate using wireless communication protocols such as Wi-Fi®, Bluetooth®, wireless USB, ultra-wideband, or the like. Once a connection is established between two wireless access components, the components may route Internet traffic through each other when needed, such as when the capacity of one does not allow additional traffic, but the capacity of another does. In embodiments of the present invention, a first wireless access component may request from a second wireless access component to allow Internet traffic to be routed through the second wireless access component, or the first wireless access component may receive a request from the second wireless access component to accept Internet traffic to be routed through the first wireless access component. Rules may be used to make the determination as to whether to allow routing of the Internet traffic or how to allow the flow of the Internet traffic.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
BSC Base Station Controller
BTS Base Transceiver Station
CDMA Code Division Multiple Access
FA Foreign Agent
GPRS General Packet Radio Service
GPS Global Positioning System
GSM Global System for Mobile communications (Groupe Spécial Mobile)
HA Home Agent
HSS Home Subscriber Server
ISP Internet Service Provider
LAN Local Area Network
LCD Liquid Crystal Display
LED Light Emitting Diode
LTE Long Term Evolution
MAG Mobile Access Gateway
MIP Mobile Internet Protocol
PDA Personal Data Assistant
PDSN Packet Data Serving Node
P-GW Packet Data Network Gateway
PPP Point-to-Point Protocol
TDMA Time Division Multiple Access
USB Universal Serial Bus
UWB Ultra-Wideband
WLAN Wireless Local Area Network Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed to the communication of two or more wireless access components, such as wireless routers or hotspots, with each other such that Internet traffic that originates from a device connected to a first wireless access component can be routed through a second wireless access component if needed. In some instances, this routing of Internet traffic may be needed if the first wireless access component currently has more Internet traffic than the second wireless access component. Other factors, such as current outbound traffic, a capacity of an outbound link, a number of registered users, a number of active users, a quality of service, or security may also be taken into account when each wireless access component determines whether it will handle an incoming Internet access request or whether it will route the request through a connected wireless access component. This allows the wireless access components to better distribute their resources and in some cases, allows for faster download speeds for connected devices.

In one aspect of the present invention, computer-readable media having computer-executable instructions embodied thereon that, when executed, facilitate a method for facilitating communication between wireless access components are provided. The method includes, at a first wireless access component, detecting that a second wireless access component is within a range of the first wireless access component. Further, the method includes determining that a wireless connection is to be established between the first wireless access component and the second wireless access component and exchanging access information between the first wireless access component and the second wireless access component. The access information allows each wireless access component to know a capacity and a current usage of each other's outbound link to the Internet. The method additionally includes establishing a wireless connection between the first wireless access component and the second wireless access component.

In a further aspect of the present invention, computer-readable media having computer-executable instructions embodied thereon that, when executed, facilitate a method for facilitating communication between wireless access components are provide. The method includes, at a first wireless access component, detecting a presence of a second wireless access component that is within a range of the first wireless access component. The method also includes establishing a wireless connection between the first wireless access component and the second wireless access component. Establishing the wireless connection comprises exchanging access information between the first wireless access component and the second wireless access component. Further, the method includes receiving a request for Internet access from a device that is connected to the first wireless access component, determining that the first wireless access component is unable to process the request based on one or more factors, and determining, based at least on the access information associated with the second wireless access component, that the second wireless access component is able to process the request. Even further, the method includes routing the request for Internet access from the device to the second wireless access component.

In yet another aspect of the present invention, computer-readable media having computer-executable instructions embodied thereon that, when executed, facilitate a method for facilitating communication between wireless access components are provided. The method includes detecting, at a first wireless access component, that a second wireless access component is within a range of the first wireless access component. Further, the method includes establishing a wireless connection between the first wireless access component and the second wireless access component such that access information is exchanged between the wireless access components, the access information indicating current and capacity resources of each wireless access component. The method additionally includes receiving a request from the second wireless access component to route Internet traffic from a device connected to the second wireless access component through the first wireless access component. Even further, the method includes authorizing the routing of the Internet traffic through the first wireless access component and utilizing a data communications link associated with the first wireless access component to route the Internet traffic from the device.

Figure 1:
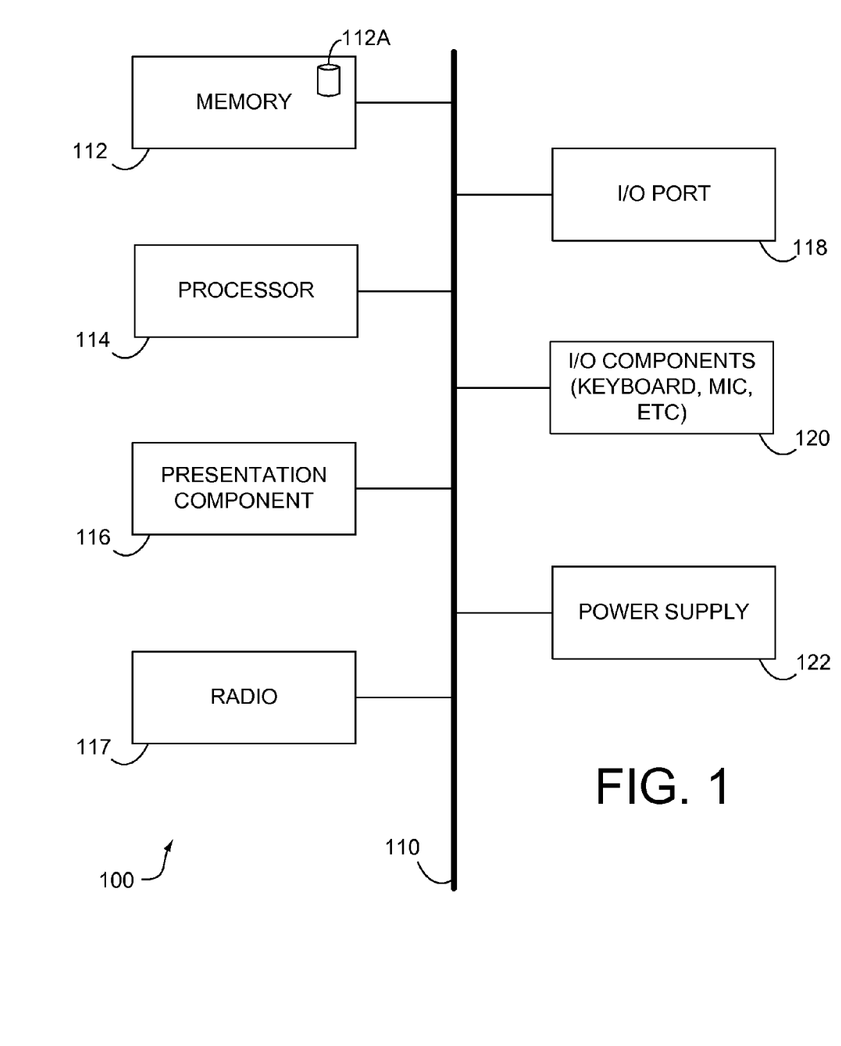
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi® communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
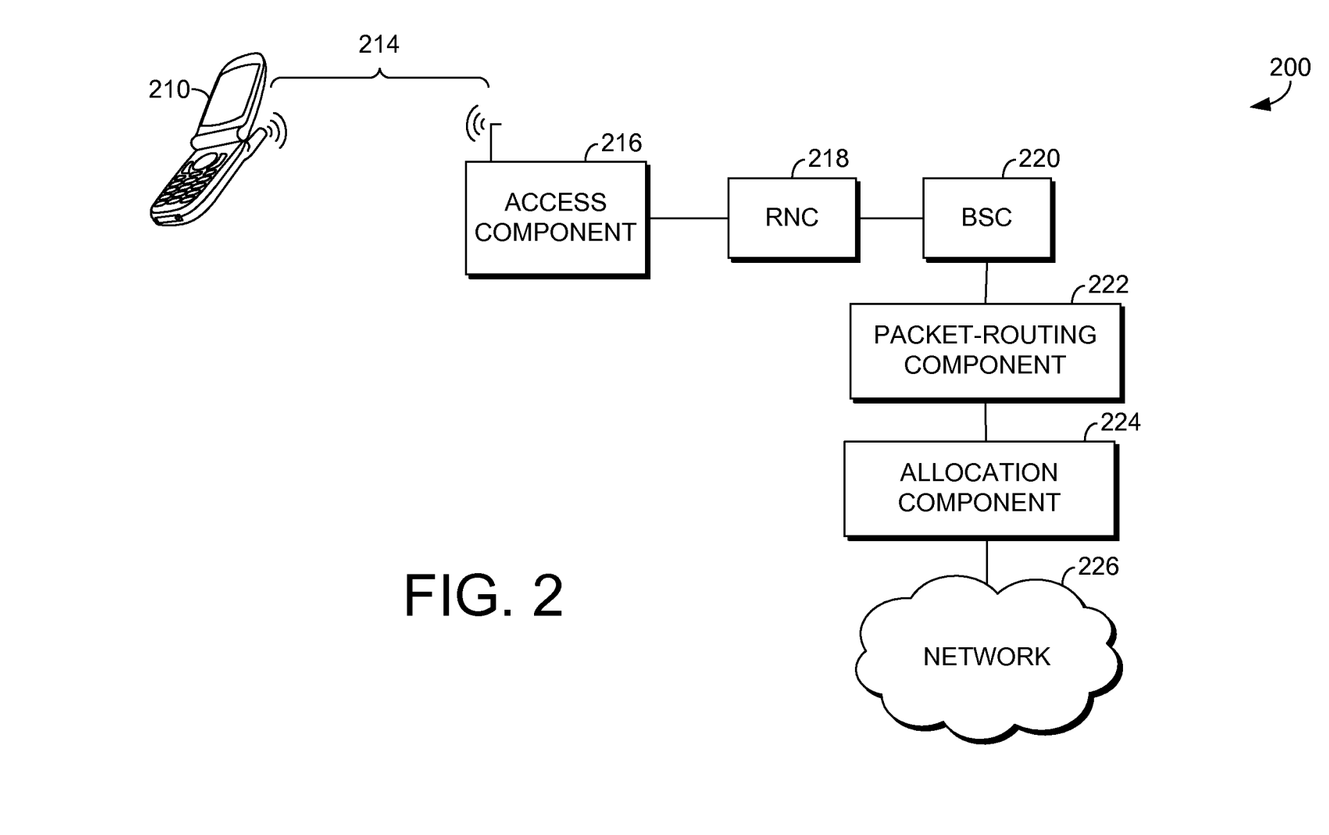
FIG. 2 depicts an illustrative operating system suitable for practicing an embodiment of the present invention.

Turning now to FIG. 2, an illustrative operating environment is provided and referenced generally by the numeral 200, which depicts an illustrative networking environment that facilitates the communication of multiple wireless access components with each other. Mobile device 210 is the type of device described in connection with FIG. 1 in one embodiment. Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using 802.11 protocol. This network is illustrated in FIG. 2 as item 226. A long-range connection may include a connection using one or more of CDMA, GPRS, GSM, TDMA, and 802.16.

Generally, the access component 216 provides access to what some skilled artisans refer to as a wireless communications network, also termed a core network, illustrated in FIG. 2 as network 226. A wireless communications network may comprise one or more of the components illustrated in FIG. 2. To the contrary, not all components that make up a wireless communications network are shown. Also, not all connections or possible connections are shown. The access component 216 may be one or more of a base transceiver station (BTS) tower, a Wireless access component, a Mobile Hotspot, and any other device that facilitates communication between mobile device 210 and network 230. In one embodiment, the access component 216 includes both a Wireless access component and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC acts as the intelligence behind base transceiver stations (BTS) (not shown), and handles allocation of radio channels, receives measurements from mobile devices, and controls handovers from one BTS to another BTS.

The components illustrated in FIG. 2, such as those that may be included in a wireless communications network include a packet-routing component 222 and an allocation component 224. As mentioned, other components not shown here may also be used to carry out aspects of the present invention. For instance, a customer-profile database and an authentication component, such as an authentication, authorization, and accounting (AAA) server may be included in the wireless network, although not shown in FIG. 2. Further, several components shown in FIG. 2 may be combined into a single component although shown separately in FIG. 2. A packet-routing component 222 may be known to those of ordinary skill in the art as a packet data serving node (PDSN), typically used in CDMA networks, a foreign agent (FA), a Local Mobility Anchor (LMA) used for PMIP functions in the PDSN for IPv6, or a serving GPRS support node (SGSN), typically used in GSM and UMTS networks. Additionally, an Access Service Network (ASN) gateway may be used and is typically used in WiMAX networks. The packet-routing component 222 acts as the serving point between the radio access and IP networks. It is responsible for managing point-to-point protocol (PPP) sessions between the mobile provider's core IP network 230 and the mobile device 210. At a high level, the packet-routing component 222 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, which helps ensure that mobile device 210 is authorized to communicate via the wireless communications network.

In one embodiment, a Long Term Evolution radio network may be used, such that the access component 216 is a EUTRAN Node B. The BSC 220 is a Mobility Management Entity. Further, in this embodiment, the packet-routing component 222 is a Serving Gateway, the allocation component 224 is a Packet Data Network Gateway (P-GW), and the authentication component 228 is a Home Subscriber Server (HSS). In one embodiment, the packet-routing component 222 includes a set of computer-executable instructions that helps carry out various aspects of technology described herein. The allocation component 224 is responsible for allocating IP addresses to mobile devices. The allocation component 224, in one embodiment, is a home agent (e.g., HA, MAG).

Figure 3:
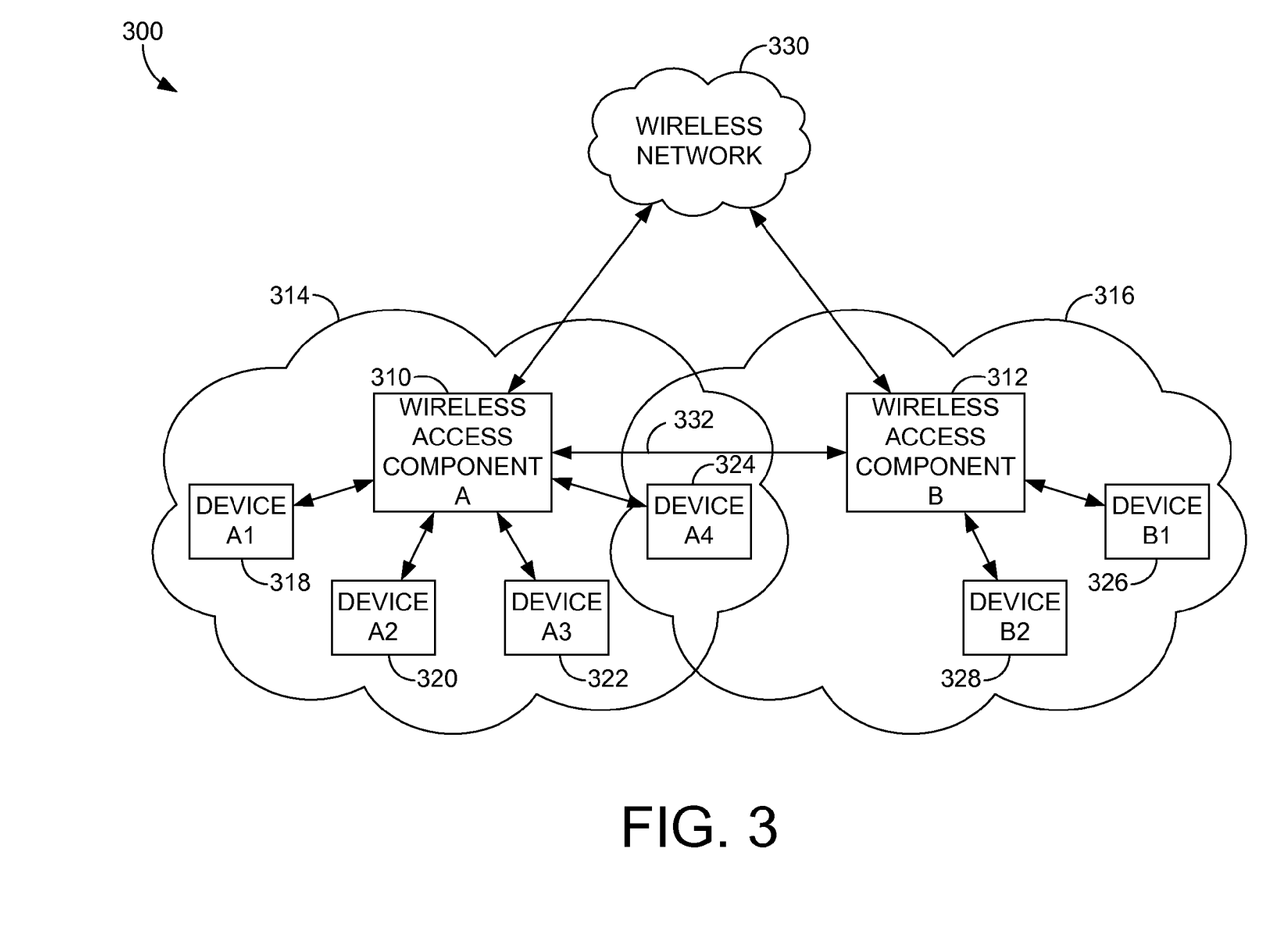
FIG. 3 depicts another illustrative operating system suitable for practicing an embodiment of the present invention.

FIG. 3 depicts another illustrative operating system suitable for practicing an embodiment of the present invention. The system of FIG. 3 is represented by numeral 300, and includes wireless access component A 310 and wireless access component B 312. Each of these wireless access components may be, for instance an access point and/or a router and may act as a hotspot. A hotspot is generally a site that offers Internet access to wireless-capable devices over a wireless LAN through the use of a router through a link to an Internet service provider (ISP). In one embodiment, the wireless access components described herein are themselves wireless, but in another embodiment, the wireless access components are not wireless. Many mobile routers or mobile hotspots are wireless, for example. Many mobile devices, such as mobile phones, can act as a mobile hotspot. Other hotspots that are not mobile are wired hotspots. Each wireless access component allows for devices within its coverage area to access the Internet. Wireless access component A 310 has coverage area 314 such that device A1 318, device A2 320, device A3 322, and device A4 324 are all within the coverage area 314. Likewise, wireless access component B 312 has a coverage area 316 such that device B1 326 and device B2 328 are within the coverage area 316. Further, device A4 324 is within both coverage areas 314 and 316. Coverage areas 314 and 316 may be a local area network (LAN).

Each device illustrated in FIG. 3 is capable of wirelessly communicating with a wireless access component, such as wireless access components 310 and 312. In one embodiment, a Wi-Fi® communication link is used between the devices and the wireless access component to communicate data. Devices that are located within a certain coverage area are able to connect to the wireless access component.

As shown in FIG. 3, the wireless access components 310 and 312 communicate with a wireless network 330 in order to send and retrieve data from the Internet. Even further, wireless access component A 310 is able to communicate with wireless access component B 312 via a wireless communications link 332. This communications link may use one of many wireless communication mechanisms, including, but not limited to, Wi-Fi®, Bluetooth®, wireless USB, ultra-wideband (UWB), or the like. Other methods of wireless communication not listed here are contemplated to be within the scope of the present invention. No matter which hotspot-to-hotspot communication system is used, the multiple hotspots are enabled to share the WAN connections between them. While in one embodiment, two wireless access components may detect each other's presence automatically, but in another embodiment, a manual detection may be made by a user of one or both of the wireless access components. Each wireless access component has a certain coverage area. However, for the task of detecting other wireless access components, the range of detection may be greater than the coverage area that is used for connecting to devices. For instance, more power can be allocated or dedicated to detecting other wireless access components than is used for the coverage area and detecting devices within this coverage area.

In one embodiment, wireless access component A 310 can choose to route its Internet traffic to both its WAN connection, such as directly to the wireless network 330, and can route some Internet traffic to the wireless access component B 312 via the wireless communications link 332. Conversely, wireless access component B 312 may route some of its Internet traffic through its WAN connection to the wireless network 330, or may choose to route some of its Internet traffic to the wireless access component A 310 via the wireless communications link 332. As used herein, Internet traffic refers to data that is communicated back and forth between a device and a wireless network such that the device can send and exchange information to and from the Internet. Between the device and the wireless network may be various network components, such as a wireless access component (e.g., wireless router), BTS, etc.

For example, in one instance, the wireless access component A 310 may have multiple devices that are currently connected to it and that are sending requests to access the Internet. If wireless access component A 310 is not able to handle all of these requests simultaneously, and has an agreement with another wireless access component, such as wireless access component B 312 to share Internet traffic, wireless access component A 310 may ask wireless access component B 312 if it can send it some of its current Internet traffic. The wireless access components may each have rules set up that are used to determine whether it can handle traffic from another wireless access component. Some of these rules may be in relation to priority, such as if wireless access component A 310 accepts some traffic from another component, whether wireless access component A 310 will continue accepting this traffic if one of its connected devices makes an additional request for access to the Internet. It may be programmed to drop the traffic from the other wireless access component, or may route its new request to another wireless access component. These details may be implementation specific, but it is important to note that there are many different ways how these components may function.

Figure 4:
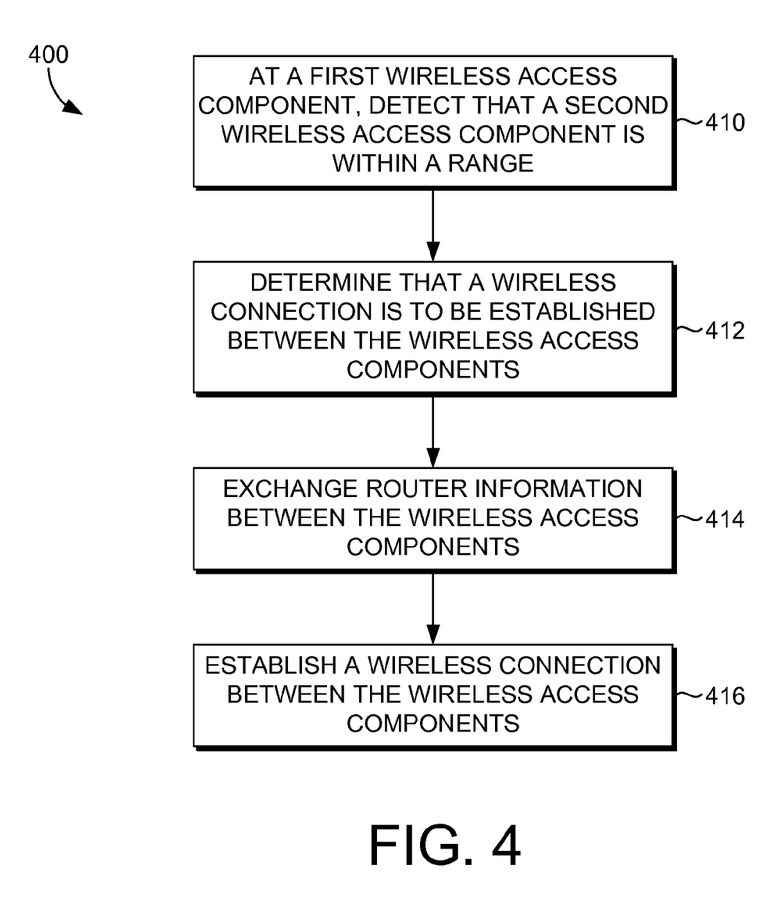
FIGS. 4-6 depict flowcharts illustrating methods for facilitating communication between wireless access components, in accordance with embodiments of the present invention.

Turning now to FIG. 4, a flowchart is shown illustrating a method 400 for facilitating communication between wireless access components, in accordance with an embodiment of the present invention. Initially at a first wireless access component, a second wireless router within range of the first wireless access component is detected, shown at step 410. In one embodiment, the distance between the first and second wireless access components may extend farther than what is covered by the coverage area of either wireless access component. In this case, extra power may be allocated by the wireless component when searching for other wireless access components such that its range increases during this time. In one embodiment, the second wireless access component is manually detected by a user of the first wireless access component. Alternatively, the second wireless access component is automatically detected by the first wireless access component. At step 412, it is determined that a wireless connection is to be established between the first and second wireless access components. This local connection between the wireless access components may use one of many wireless communication technologies including, but certainly not limited to Wi-Fi®, Bluetooth®, wireless USB, ultra-wideband, or the like. Access information is exchanged between the first and second wireless access components at step 414. This access information allows each wireless access component to know each other's capacity and current usage in relation to the outbound link to the Internet. Periodically, access information may be exchanged between the wireless access components, as usage information and information regarding current active users frequently changes. In one instance, it is useful for the first wireless access component to have access information from the second wireless access component so that the first wireless access component knows whether the second component has the resources to handle additional Internet traffic.

At step 416, a wireless connection is established between the first and second wireless access components. Once a wireless connection is established, based on one or more rules associated with each wireless access component, Internet traffic may be routed between the wireless access components when, for instance, one of the wireless access components is able to handle Internet traffic from another wireless access component. In this instance, the first wireless access component may currently have less active users than the second wireless access component. Or, the first wireless access component may have more resources to handle Internet traffic than the second wireless access component. Even further, the first wireless access component may have a higher bandwidth than the second wireless access component. Each wireless access component may have logic that allows each to determine, for instance, whether to accept a request to route Internet traffic through the wireless access component. In some instances, a first wireless access component may decline a request from a second wireless access component to route Internet traffic through the first wireless access component. This may depend on current connected users, bandwidth, current Internet traffic from devices connected to the first wireless access component, etc.

In one embodiment, a request is received from the second wireless access component to route Internet traffic through the first wireless access component. It is determined whether to allow routing of the Internet traffic from the second wireless access component. If the routing of the Internet traffic is allowed by the first wireless access component, the first wireless access component receives the Internet traffic from the second wireless access component. But, if the routing of the Internet traffic is not allowed by the first wireless access component, the first wireless access component communicates to the second wireless access component that the routing of the Internet traffic is not allowed.

In an alternative embodiment, an Internet access request is received from a device that is currently connected to the first wireless access component. It is determined whether the first wireless access component presently has capacity to handle the Internet access request. If the first wireless access component has the capacity, the Internet access request is handled by the first wireless access component. But, if the first wireless access component does not have the capacity to handle the request, it is determined whether the second wireless access component will accept the Internet access request. Further, if the second wireless access component accepts the Internet access request from the first wireless access component, the Internet access request is routed to the second wireless access component. In some embodiments, Internet traffic associated with a particular device may be routed through two or more wireless access components such that the Internet traffic is divided up between the wireless access components.

Figure 5:
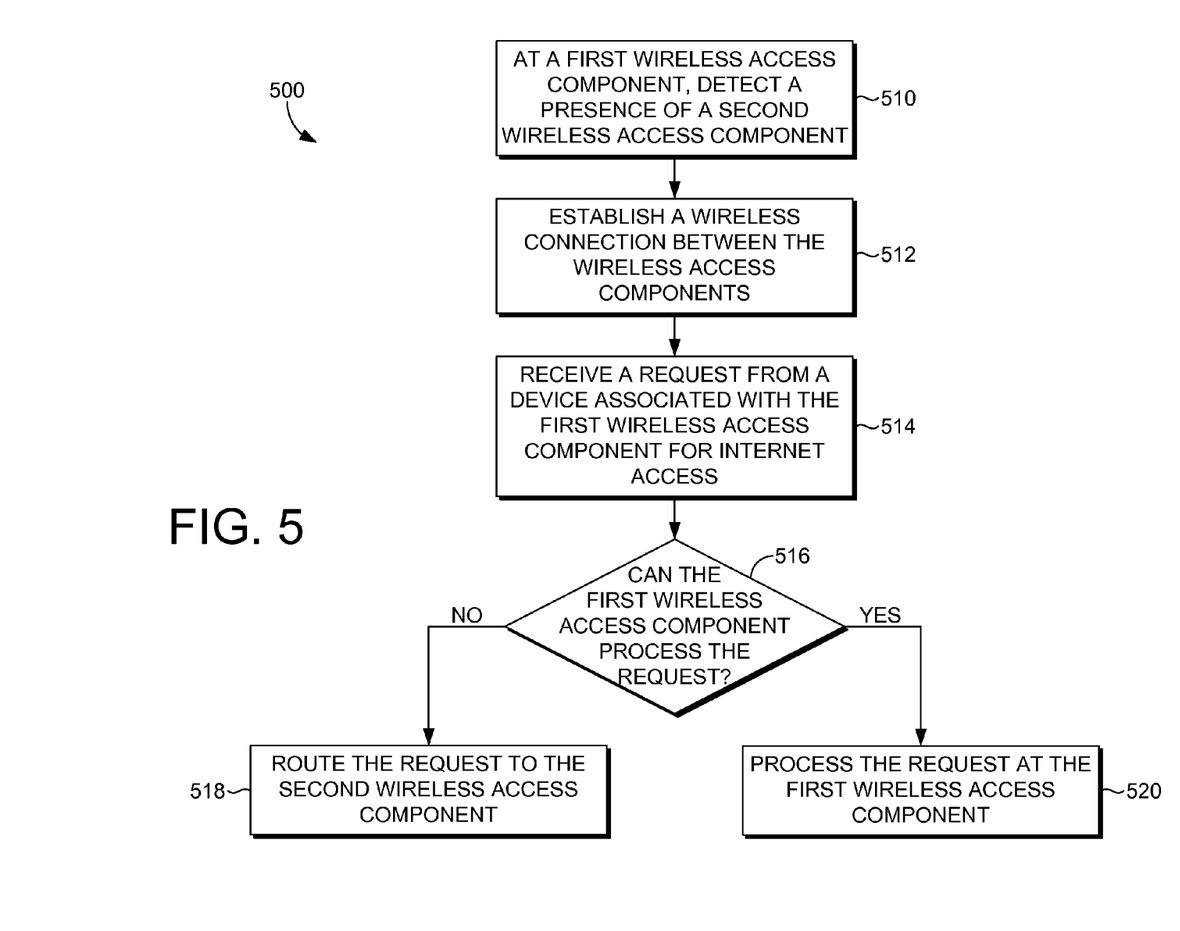

Referring to FIG. 5, a flowchart illustrates a method 500 for facilitating communication between wireless access components, in accordance with an embodiment of the present invention. At step 510, the presence of a second wireless access component is detected at a first wireless access component. As mentioned, this detection may be done manually or automatically. When a wireless access component is detected, it may be within a range of the wireless access component that is doing the detection. At step 512, a wireless connection is established between the first and second wireless access components. When establishing a wireless connection, access information is exchanged between the wireless access components. This access information indicates current and capacity resources for each of the wireless access components. The wireless connection between the wireless access components may use one of many available wireless communication protocols, including, but not limited to Wi-Fi®, Bluetooth®, wireless USB, or ultra-wideband.

At step 514, a request is received from a device connected or associated with the first wireless access component for Internet access. The device, being connected to the first wireless access component, is within a coverage area of the first wireless access component. It is then determined, at step 516, whether the first wireless router can process the request. This determination may be based on multiple factors, such as current outbound traffic, a capacity of an outbound link, a number of registered users, a number of active users, a quality of service, stability or security of the first and second wireless access components, etc. If the first wireless access component determines that it is unable to process the request at this time or wants to compare its available resources with those of another wireless access component, the first wireless access component routes the request to the second wireless access component at step 518. But if the first wireless access component determines that it can handle the request, it processes the request, shown at step 520.

Figure 6:
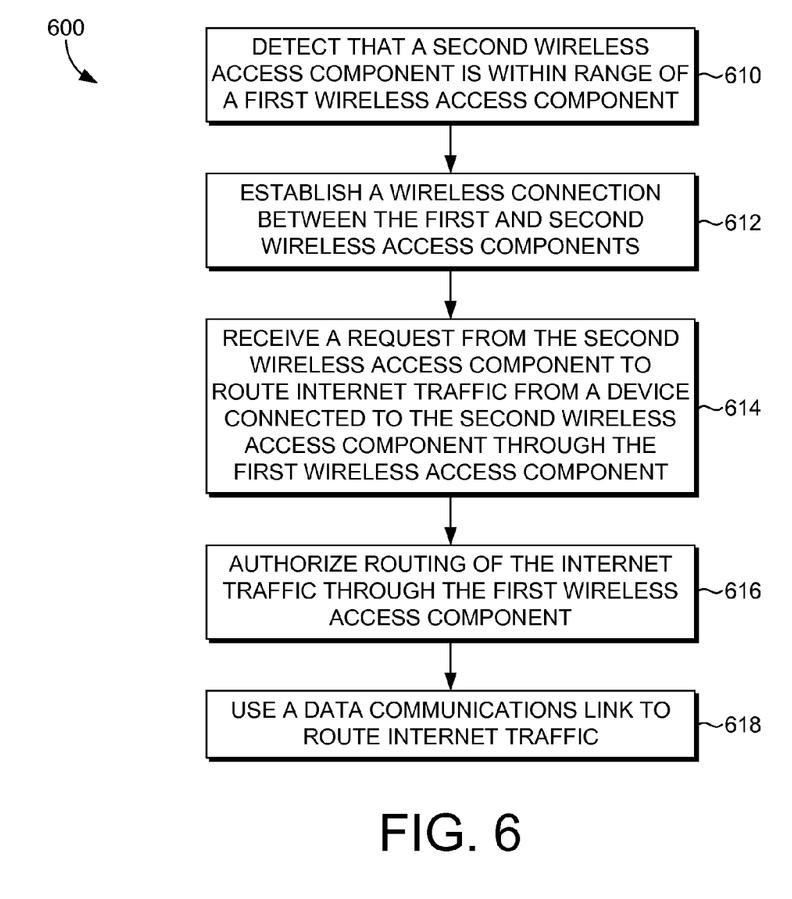

FIG. 6 depicts a flowchart illustrating a method for facilitating communication between wireless access components, in accordance with an embodiment of the present invention. Initially at step 610, it is detected that a second wireless access component is within range of a first wireless access component. As mentioned, this detection may be manual or automatic, such as without human intervention. At step 612, a wireless connection is established between the first and second wireless access components. Establishing a wireless connection includes access information being exchanged between the wireless access components. The access information indicates the current and capacity resources of each of the wireless access components. A request is received at step 614 from the second wireless access component to route Internet traffic from a device connected to the second wireless access component through the first wireless access component. In this case, the second wireless access component may have analyzed its current resources for handling additional Internet traffic and may have determined that it cannot handle the additional Internet traffic.

At step 616, the first wireless access component authorizes routing of the Internet traffic through the first wireless access component. At step 618, a data communications link associated with the first wireless access component is used to route the Internet traffic from the device. When data is to be sent to the device, the first wireless access component routes this Internet traffic back through the second wireless access component so that it can be sent to the device connected to the second wireless access component.

In one embodiment, the first wireless access component receives an Internet access request from a device connected to the first wireless access component while the Internet traffic from the device connected to the second wireless access component is being routed through the first wireless access component. The first wireless access component then determines whether to continue accepting the Internet traffic from the second wireless access component given the new request from the connected device. In one instance, the first wireless access component determines that it is unable to continue handling the Internet traffic routed from the second wireless access component based on priority rules that are put in place by the network associated with the wireless access component.

Many different arrangements of the various components depicted, as well as components not shown, are possible without departing from the scope of the claims below.

Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method for facilitating communication between wireless access components, the method comprising:
   at a first wireless access component:
      automatically and without human intervention, detecting that a second wireless access component is within a range of the first wireless access component;
      determining that a wireless connection is to be established between the first wireless access component and the second wireless access component;
      establishing the wireless connection directly between the first wireless access component and the second wireless access component;
      exchanging, using the wireless connection, access information between the first wireless access component and the second wireless access component, the access information comprising current usage and capacity information associated with each of the wireless access component's outbound link to the Internet;
      receiving a request from the second wireless access component to route Internet traffic from a device connected to the second wireless access component through the first wireless access component;
      communicating an acceptance response to the second wireless access component authorizing the routing of the Internet traffic through the first wireless access component;
      routing the Internet traffic from the device connected to the second wireless access component utilizing a data communications link associated with the first wireless access component;
      while routing the Internet traffic from the device connected to the second wireless access component, receiving an Internet access request from a device connected to the first wireless access component;
      based on a set of priority rules, determining not to continue routing the Internet traffic from the device connected to the second wireless access component; and
      communicating the Internet traffic routed by the first wireless access component back to the second wireless access component where it is subsequently sent to the device connected to the second wireless access component.

2. The non-transitory computer-readable media of claim 1, further comprising periodically updating the second wireless access component with the access information associated with the first wireless access component.

3. The non-transitory computer-readable media of claim 1, wherein the access information exchanged between the wireless access components further comprises a number of registered users, and a number of active users.

4. The non-transitory computer-readable media of claim 1, wherein the set of priority rules specify when Internet traffic from another wireless access component is allowed to be routed through the first wireless access component.

5. The non-transitory computer-readable media of claim 4, wherein the set of rules is determined by a wireless network associated with the first wireless access component.

6. Non-transitory computer-readable media having computer-executable instructions embodied thereon that, when executed, facilitate a method for facilitating communication between wireless access components, the method comprising:

at a first wireless access component:
- automatically and without human intervention, detecting a presence of a second wireless access component that is within a range of the first wireless access component;
- establishing a wireless connection directly between the first wireless access component and the second wireless access component;
- exchanging access information directly between the first wireless access component and the second wireless access component using the wireless connection, the access information comprising a number of registered users and a number of active users associated with each of the wireless access component's outbound link to the Internet;
- receiving a request for Internet access from a device that is connected to the first wireless access component, the request comprising a first Internet access request and a second Internet access request;
- based on one or more factors, determining that the first wireless access component is unable to process the second Internet access request;
- communicating a request to the second wireless access component to accept the second Internet access request;
- receiving from the second wireless access component an acceptance response; and
- routing the second Internet access request from the device to the second wireless access component while maintaining the connection between the device and the first wireless access component such that the first wireless access component processes the first Internet access request while the second wireless access component processes the second Internet access request.

7. The non-transitory computer-readable media of claim 6, wherein the device is within a coverage area of the first wireless access component.

8. The non-transitory computer-readable media of claim 6, wherein the wireless connection between the first and the second wireless access components uses one or more of Wi-Fi, Bluetooth, wireless USB, or ultra-wideband.

9. The non-transitory computer-readable media of claim 6, wherein the access information further comprises a quality of service, or security.

10. Non-transitory computer-readable media having computer-executable instructions embodied thereon that, when executed, facilitate a method for facilitating communication between wireless access components, the method comprising:

at a first wireless access component:
- automatically and without human intervention, detecting that a second wireless access component is within a range of the first wireless access component;
- establishing a direct wireless connection between the first wireless access component and the second wireless access component;
- exchanging, using the wireless connection, access information between the first wireless access component and the second wireless access component, the access information comprising current outbound traffic and capacity resources associated with each wireless access component's outbound link to the Internet;
- receiving a request, using the wireless connection, from the second wireless access component to route a first portion of Internet traffic from a device connected to the second wireless access component through the first wireless access component;
- communicating an acceptance response to the second wireless access component authorizing the routing of the first portion of the Internet traffic through the first wireless access component;
- routing the first portion of the Internet traffic from the device utilizing a data communications link associated with the first wireless access component while the second wireless access component simultaneously routes a second portion of Internet traffic from the device; and
- communicating the first portion of the Internet traffic routed by the first wireless access component back to the second wireless access component where it is subsequently sent to the device along with the second portion of the Internet traffic routed by the second wireless access component.

11. The non-transitory computer-readable media of claim 10, wherein authorizing the routing of the first portion of the Internet traffic through the first wireless component is based partly on the current outbound traffic of the first wireless component.

12. The non-transitory computer-readable media of claim 10, further comprising receiving an Internet access request from a device connected to the first wireless access component while the first portion of the Internet traffic from the device connected to the second wireless access component is being routed through the first wireless access component.

13. The non-transitory computer-readable media of claim 12, further comprising determining whether to discontinue the routing of the first portion of the Internet traffic from the device connected to the second wireless access component.

14. The non-transitory computer-readable media of claim 13, wherein the determination is based on one or more priority rules determined by a network associated with the first wireless access component.

* * * * *